United States Patent
Tsai

(10) Patent No.: US 7,218,165 B1
(45) Date of Patent: May 15, 2007

(54) BOOST CIRCUIT

(75) Inventor: Hong-Ping Tsai, Hsinchu (TW)

(73) Assignee: eMemory Technology Inc., Hsinchu (TW)

(*) Notice: Subject to any disclaimer, the term of this patent is extended or adjusted under 35 U.S.C. 154(b) by 0 days.

(21) Appl. No.: 11/306,385

(22) Filed: Dec. 27, 2005

(51) Int. Cl.
*G05F 1/10* (2006.01)

(52) U.S. Cl. ...................................... 327/536
(58) Field of Classification Search ............... 327/535, 327/536, 537
See application file for complete search history.

(56) References Cited

U.S. PATENT DOCUMENTS 7,075,357 B2 * 7/2006 Koshita ...................... 327/536

* cited by examiner

*Primary Examiner*—Jeffrey Zweizig
(74) *Attorney, Agent, or Firm*—Jianq Chyun IP Office

(57) ABSTRACT

A boost circuit comprising a first level shifter and a switch circuit is provided. The first level shifter outputs either an output voltage of the boost circuit or a first bias voltage according to a boost control signal. The switch circuit determines whether to transmit a second bias voltage to an output terminal of the boost circuit according to the output of the first level shifter. The present invention further comprises a capacitance equivalent circuit and a second level shifter. The capacitance equivalent circuit comprises a first terminal and a second terminal, and the first terminal is electrically coupled to the output terminal of the boost circuit. Similarly, the second level shifter outputs a third bias voltage or the first bias voltage to the second terminal of the capacitance equivalent circuit. In addition, the first bias voltage is smaller than the second bias voltage and the third bias voltage.

7 Claims, 3 Drawing Sheets

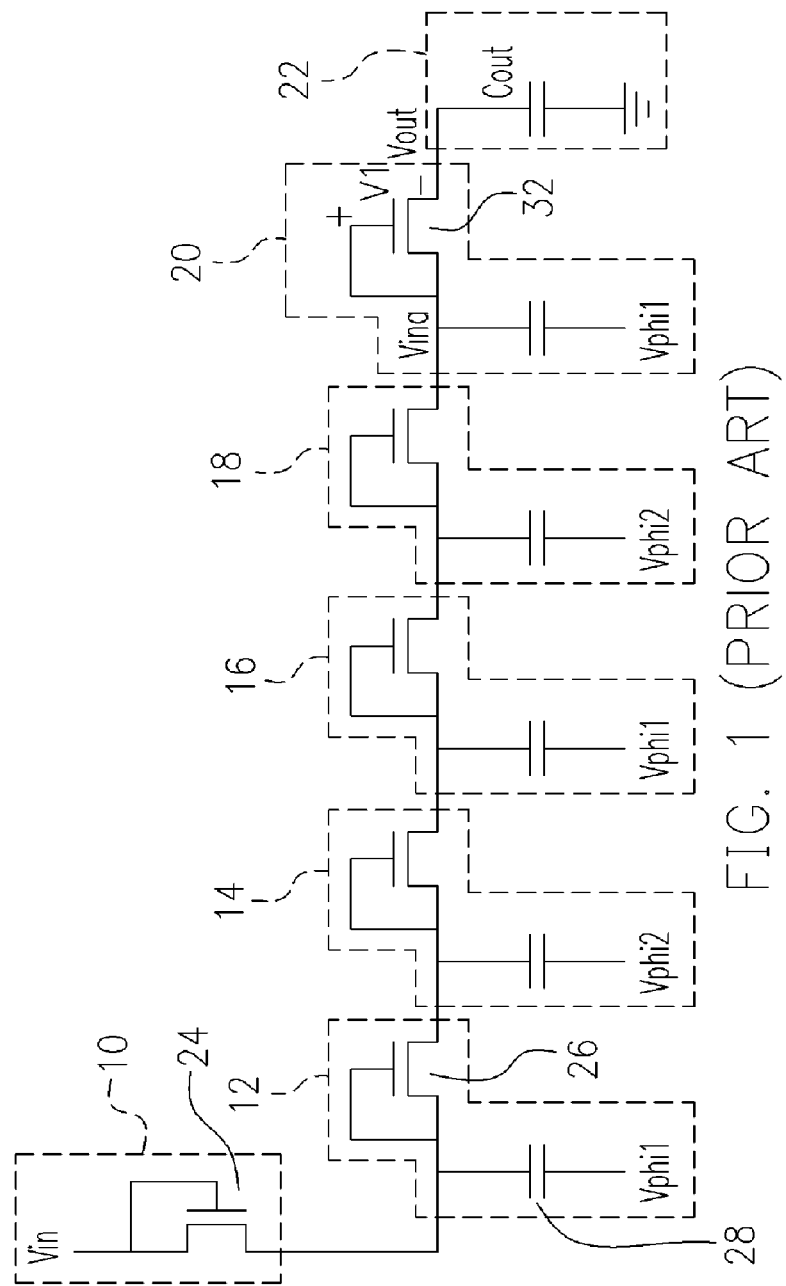
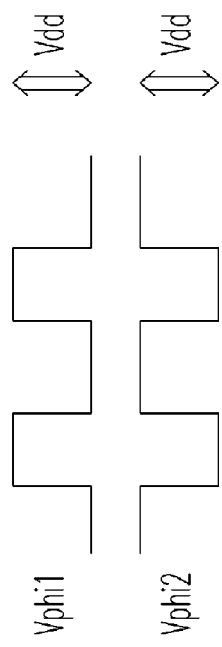
FIG. 1 (PRIOR ART)
FIG. 2 (PRIOR ART)

BOOST CIRCUIT

BACKGROUND OF THE INVENTION

1. Field of the Invention

The present invention relates to a boost circuit, and more particularly, to a boost circuit whose output voltage is equal to the maximum rated voltage.

2. Description of the Related Art

The boost circuit has been applied in the EEPROM (Electrically erasable programmable read only memory) for a couple of years. FIG. 1 schematically shows a conventional Dickson boost circuit. As shown in FIG. 1, the conventional Dickson boost circuit comprises an input stage 10, a plurality of booster stages (12, 14, 16, 18, and 20), and an output stage 22. Wherein, the input stage 10 is mainly composed of an NMOS transistor 24. A drain and a gate of the NMOS transistor 24 are connected and jointly receive an input voltage Vin, and a source is electrically coupled to the first booster stage 12. Each booster stage comprises an NMOS transistor and a coupling capacitor, and the booster stage 12 is exemplified herein for describing the connection. A drain and a gate of the NMOS transistor 26 are jointly connected to a first terminal of the coupling capacitor 28, and a source is serially connected to a drain of a next boost stage 14. A second terminal of the coupling capacitor 28 receives a first clock signal Vphi1. In addition, two different clocks signal are provided as shown in the diagram. The first clock signal Vphi1 is provided to the coupling capacitor disposed in the odd number booster stages (e.g. the booster stages 12, 16, and 20), and the second clock signal Vphi2 is provided to the coupling capacitor disposed in the even number booster stages (e.g. the booster stages 14 and 18). As shown in FIG. 2, the first clock signal Vphi1 is not overlapped with the second clock signal Vphi2, and they are the complementary signals with a voltage of $V_{DD}$. In addition, the output stage is composed of a greater output capacitor Cout.

During the operation, when the first clock signal Vphi1 rises to a high voltage, the drain voltage of the NMOS transistor in the odd number booster stages (e.g. the booster stages 12, 16, and 20) is pulled up due to the coupling effect generated by the coupling capacitor, and this high voltage is then transmitted to the even number booster stages. Then, when the second clock signal Vphi2 rises to a high voltage, the drain voltage of the NMOS transistor in the even number booster stages (e.g. the booster stages 14 and 18) is pulled up due to the coupling effect generated by the coupling capacitor. With such method, the voltage rises to a desired high voltage value.

However, since there is a potential difference between the gate and the source of each transistor, if it is desired to obtain a desired output voltage from the source of the transistor in each booster stage, a voltage higher than the output voltage of the source should be provided to the drain of each transistor. Using the booster stage 20 as an example, if it is desired to output a desired output voltage Vout from the source of the transistor 32, the input voltage Vina provided to the drain of the transistor 32 must be higher than the output voltage Vout, thus the voltage difference V1 between the gate and the source of the transistor 32 can be overcome. In addition, since the drain voltage of each transistor must be higher than the source voltage, the transistor is easily damaged by the drain voltage, which causes problems such as the current leakage or circuit latch-up.

SUMMARY OF THE INVENTION

Therefore, it is an object of the present invention to provide a boost circuit. The boost circuit ensures that the output voltage of the boost circuit is equal to the maximum rated voltage, such that the problem of the MOS transistor damage can be avoided.

The present invention provides a boost circuit having an output terminal for providing an output voltage. The boost circuit comprises a first level shifter and a switch circuit. Wherein, the first level shifter selectively outputs either an output voltage of the boost circuit or a first bias voltage according to a boost control signal. The switch circuit determines whether to transmit a second bias voltage to an output terminal of the boost circuit according to the output of the first level shifter. Wherein, the first bias voltage is smaller than the output voltage of the boost circuit. In addition, the present invention further comprises a capacitance equivalent circuit and a second level shifter. Wherein, the capacitance equivalent circuit comprises a first terminal and a second terminal, and the first terminal is electrically coupled to the output terminal of the boost circuit. Similarly, the second level shifter selectively outputs a third bias voltage or the first bias voltage to the second terminal of the capacitance equivalent circuit, and the third bias voltage is greater than the first bias voltage.

In an embodiment of the present invention, the switch circuit comprises a PMOS transistor. Wherein, a first source/drain receives the second bias voltage, a gate receives the output from the first level shifter, and a second source/drain is electrically coupled to the output terminal of the boost circuit.

In addition, the capacitor equivalent circuit comprises an NMOS transistor. Wherein, a gate is electrically coupled to the output terminal of the boost circuit via a first terminal of the capacitance equivalent circuit. A first source/drain and a second source/drain are short circuited and jointly receive the output of the second level shifter via a second terminal of the capacitance equivalent circuit.

When it is required to rise the second bias voltage in the present invention, the boost control signal is enabled, such that the first level shifter will send the output voltage of the boost circuit to the gate of the PMOS transistor, so as to turn off the PMOS transistor. Accordingly, it is ensured that the output voltage provided by the present invention is the maximum rated voltage of the whole boost circuit.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 1 schematically shows a conventional Dickson boost circuit.

FIG. 2 schematically shows a timing diagram of the first clock signal Vphi1 and the second clock signal Vphi2 of FIG. 1.

DESCRIPTION OF PREFERRED EMBODIMENTS

Figure 3:
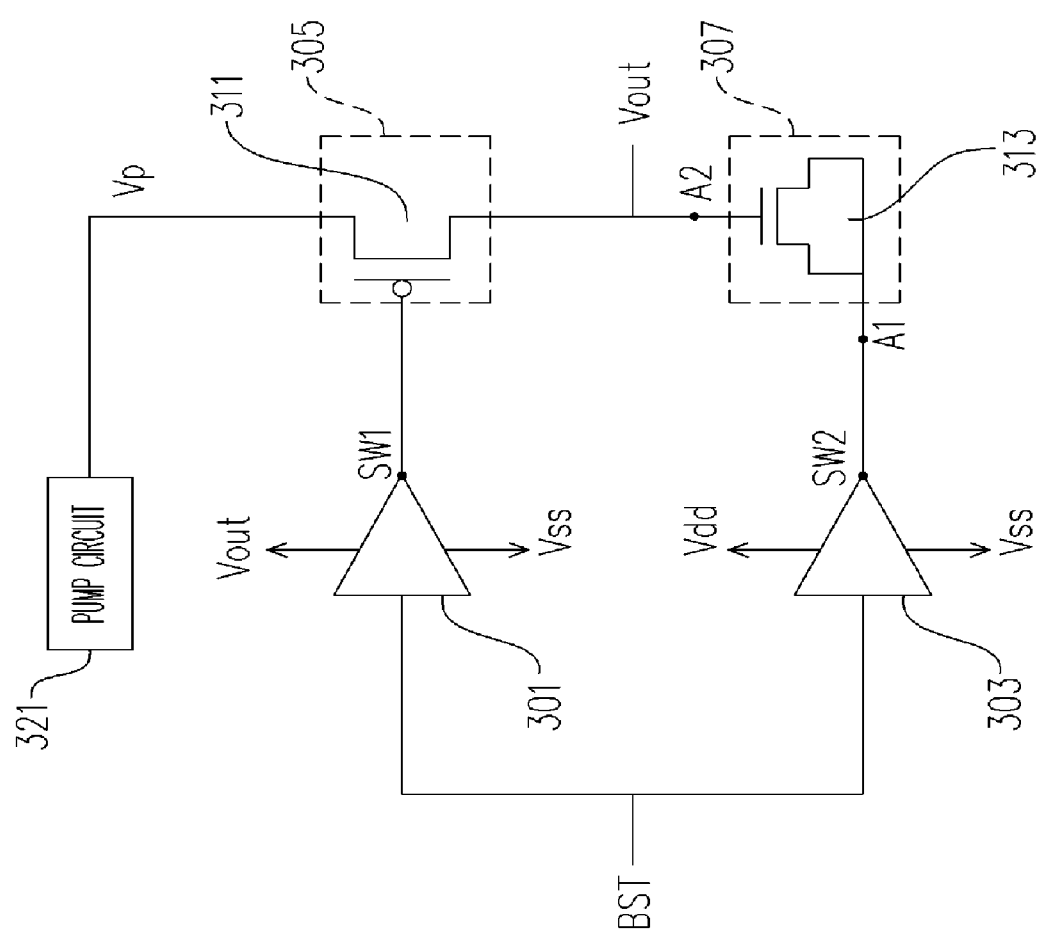
FIG. 3 schematically shows a circuit diagram of a boost circuit according to a preferred embodiment of the present invention.

FIG. 3 schematically shows a circuit diagram of a boost circuit according to a preferred embodiment of the present invention. Referring to FIG. 3, the boost circuit provided by the present invention comprises two level shifters 301 and 303. Wherein, an input terminal of the level shifter 301 receives a boost control signal BST, and an output terminal SW1 is electrically coupled to a switch circuit 305. In addition, an input terminal of the level shifter 303 is electrically coupled to the input terminal of the level shifter 301, and an output terminal SW2 is electrically coupled to a terminal A1 of a capacitance equivalent circuit 307.

In the present invention, the level shifter 301 selectively outputs the bias voltage Vss or the output voltage Vout of the boost circuit to the switch circuit 305 according to the boost control signal BST. In general, the bias voltage Vss is grounded. In addition, in a preferred embodiment of the present invention, the switch circuit 305 is electrically coupled to an output terminal of a pump circuit 321 for receiving the voltage Vp generated by the pump circuit 321. The switch circuit 305 determines whether to transmit the voltage Vp to the output terminal of the boost circuit as the output voltage Vout according to the voltage level on the output terminal SW1 of the level shifter 301.

The switch circuit 305 may comprise a PMOS transistor 311. Wherein, a gate of the PMOS transistor 311 is electrically coupled to the output terminal SW1 of the level shifter 301, a first source/drain receives the output voltage Vp of the pump circuit 312, and a second source/drain is electrically coupled to the output terminal of the boost circuit.

Referring to FIG. 3, the input terminal of the level shifter 303 is electrically coupled to the input terminal of the level shifter 301. Accordingly, the level shifter 303 selectively outputs the bias voltage Vss or the bias voltage Vdd to the capacitance equivalent circuit 307 according to the boost control signal BST. Specifically, when the boost control signal BST is enabled, the level shifter 303 outputs the bias voltage Vdd. Otherwise, the level shifter 303 outputs the bias voltage Vss.

In addition, the capacitance equivalent circuit 307 has two terminals A1 and A2. Wherein, the first terminal A1 is electrically coupled to an output terminal SW2 of the level shifter 303, and the second terminal A2 is electrically coupled to the output terminal of the boost circuit. In the present embodiment, the capacitance equivalent circuit 307 may comprise an NMOS transistor 313. Wherein, a gate is electrically coupled to the output terminal Vout of the boost circuit via the terminal A2 of the capacitance equivalent circuit 307. The first source/drain and the second source/drain are short circuited and jointly coupled to the output terminal SW2 of the level shifter 303 via the terminal A1.

Figure 4:
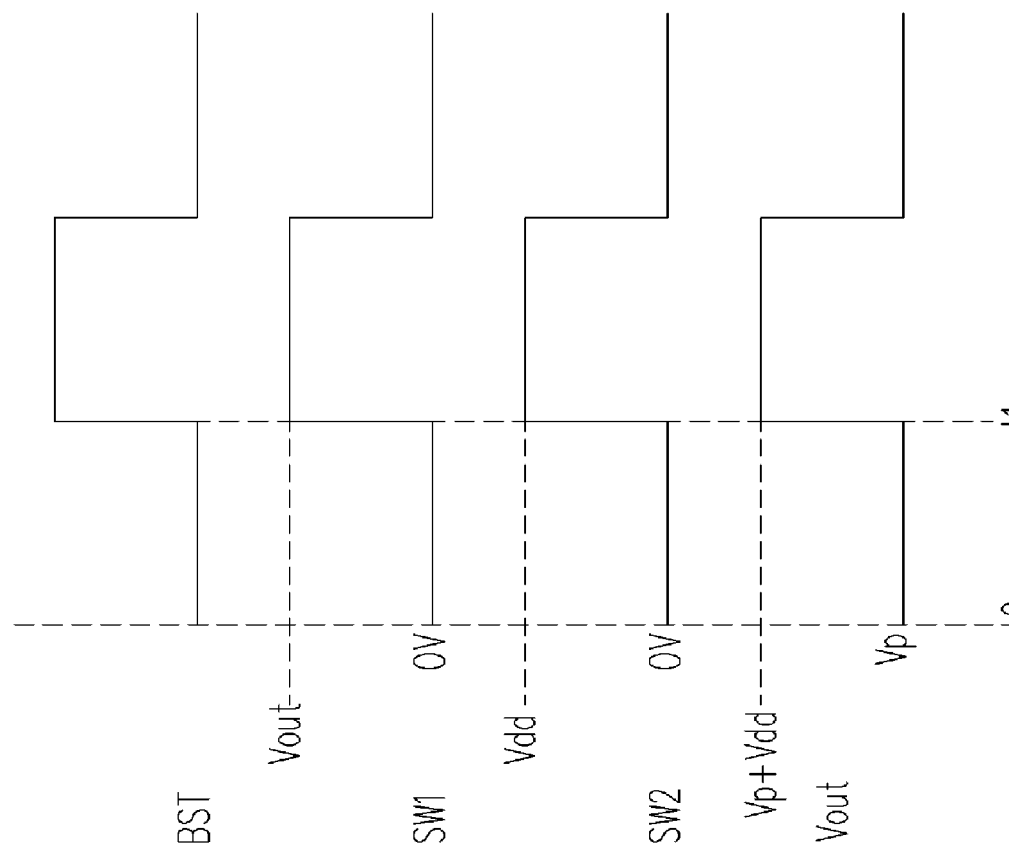
FIG. 4 schematically shows a signal timing diagram of a boost circuit according to a preferred embodiment of the present invention.

FIG. 4 schematically shows a timing diagram of a signal for the boost circuit according to a preferred embodiment of the present invention. Referring to FIGS. 3 and 4, at the time point t0, since the boost control signal BST is disabled, the voltage on the output terminal SW1 of the level shifter 301 is the bias voltage Vss. Here, it is assumed that the bias voltage Vss is 0 volt, which is the ground potential, when the level shifter 301 outputs the bias voltage Vss, the PMOS transistor 311 is turned on. Similarly, the level shifter 303 also outputs the bias voltage Vss.

Since the first source/drain and the second source/drain of the NMOS 313 are short circuited, the NMOS transistor 313 is regarded as a capacitor. When the PMOS transistor 311 is turned on, the output voltage Vp of a pump circuit 321 is transmitted to the output terminal of the boost circuit to charge the NMOS transistor 313. Meanwhile, since the potential on the output terminal SW2 of the level shifter 303 is equal to the ground potential, the output voltage level Vout of the boost circuit is equal to the output voltage Vp of the pump circuit 321.

At the time point t1, the boost control signal BST is enabled. Meanwhile, the output voltage Vout of the boost circuit is output from the output terminal SW1 of the level shifter 301 to the gate of the PMOS transistor 311, so as to turn off the PMOS transistor 311. In addition, a bias voltage Vdd is generated on the output terminal SW2 of the level shifter 303, wherein the voltage value of the bias voltage Vdd is predetermined. Assuming at the time point t1, the NMOS transistor 313 has been charged to Vp, the voltage value of the output voltage Vout of the boost circuit is the summation of the voltage Vdd output from the level shifter 303 and the voltage Vp stored in the NMOS transistor 313. Accordingly, the user can set the voltage value of the bias voltage Vdd to a certain number, such that the boost circuit can generate the desired output voltage Vout.

As described above, it is ensured that the output voltage Vout of the boost circuit is the maximum rated value of the whole boost circuit. Accordingly, the structure of the MOS transistor will not be damaged and the problem is eliminated.

Although the invention has been described with reference to a particular embodiment thereof, it will be apparent to one of the ordinary skills in the art that modifications to the described embodiment may be made without departing from the spirit of the invention. Accordingly, the scope of the invention will be defined by the attached claims not by the above detailed description.

What is claimed is:

1. A boost circuit having an output terminal for providing an output voltage, comprising:
   a first level shifter for selectively outputting either the output voltage or a first bias voltage according to a boost control signal, wherein the first bias voltage is smaller than the output voltage;
   a switch circuit for determining whether to transmit a second bias voltage to the output terminal according to an output of the first level shifter, wherein the second bias voltage is greater than the first bias voltage;
   a capacitance equivalent circuit having a first terminal and a second terminal, wherein the first terminal is electrically coupled to the output terminal; and
   a second level shifter for selectively outputting either a third bias voltage or the first bias voltage to the second terminal of the capacitance equivalent circuit according to the boost control signal, wherein the third bias voltage is greater than the first bias voltage.

2. The boost circuit of claim 1, wherein the switch circuit comprises a PMOS transistor having a first source/drain receiving the second bias voltage, a gate receiving the output of the first level shifter, and a second source/drain electrically coupled to the output terminal.

3. The boost circuit of claim 1, wherein the capacitance equivalent circuit comprises an NMOS transistor having a gate electrically coupled to the output terminal via the first terminal, the first source/drain and the second source/drain are short circuited with each other and receiving an output of the second level shifter via the second terminal.

4. The boost circuit of claim 1, wherein the second bias voltage is provided by a pump circuit.

5. The boost circuit of claim 1, wherein a potential of the first bias voltage is equal to a ground potential.

6. The boost circuit of claim 1, wherein when the boost control signal is enabled, the first level shifter outputs the output voltage, and when the boost control signal is disabled, the first level shifter outputs the first bias voltage.

7. The boost circuit of claim 1, wherein when the boost control signal is enabled, the second level shifter outputs the third bias voltage, and when the boost control signal is disabled, the second level shifter outputs the first bias voltage.

* * * * *